United States Patent
Liu

(10) Patent No.: US 7,797,499 B2
(45) Date of Patent: Sep. 14, 2010

(54) APPARATUS, SYSTEM, AND METHOD FOR UNINTERRUPTED STORAGE CONFIGURATION

(75) Inventor: Lei Liu, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 526 days.

(21) Appl. No.: 11/669,044

(22) Filed: Jan. 30, 2007

(65) Prior Publication Data

US 2008/0183989 A1 Jul. 31, 2008

(51) Int. Cl.
*G06F 13/00* (2006.01)

(52) U.S. Cl. .................. 711/162; 711/114; 711/170

(58) Field of Classification Search .......... 711/114, 711/162, 170
See application file for complete search history.

(56) References Cited

U.S. PATENT DOCUMENTS

| | | | | |
|---|---|---|---|---|
| 5,964,886 | A | 10/1999 | Slaughter et al. | 714/4 |
| 6,138,147 | A * | 10/2000 | Weaver et al. | 709/206 |
| 6,185,655 | B1 | 2/2001 | Peping | 711/6 |
| 6,898,670 | B2 | 5/2005 | Nahum | 711/114 |
| 6,901,409 | B2 | 5/2005 | Dessloch et al. | 707/103 |
| 7,051,122 | B2 | 5/2006 | Reuter et al. | 710/5 |
| 7,216,258 | B2 * | 5/2007 | Ebsen et al. | 714/33 |
| 2004/0044643 | A1 | 3/2004 | deVries et al. | 707/1 |
| 2004/0199758 | A1 | 10/2004 | Meaney et al. | 713/2 |
| 2006/0064416 | A1 | 3/2006 | Sim-Tang | 707/6 |

FOREIGN PATENT DOCUMENTS

EP 1 150 205 4/2000

OTHER PUBLICATIONS

Larson et al., "Virtual Hot Spare Disk Units", TDB, vol. 37, No. 9, Sep. 1994.

\* cited by examiner

*Primary Examiner*—Reba I Elmore
(74) *Attorney, Agent, or Firm*—Kunzler Needham Massey & Thorpe

(57) ABSTRACT

An apparatus, system, and method are disclosed for uninterrupted storage configuration. The apparatus for uninterrupted storage configuration is provided with a plurality of modules configured to functionally execute the steps of generating a temporary location for storage configuration information, saving the storage configuration information to the temporary location, and copying the storage configuration information from the temporary location to a storage medium in response to a determination that the storage medium is physically configurable. In one embodiment, these modules include an initialization module, a storage manager interface, and a storage medium interface. Beneficially, such an apparatus, system, and method would streamline the configuration process, improving the efficiency of a typical storage manager, and allowing a storage system administrator to focus his attention on other tasks.

20 Claims, 6 Drawing Sheets

APPARATUS, SYSTEM, AND METHOD FOR UNINTERRUPTED STORAGE CONFIGURATION

BACKGROUND OF THE INVENTION

1. Field of the Invention

This invention relates to storage system configuration and more particularly relates to enabling a system administrator to perform uninterrupted configuration of a storage system.

2. Description of the Related Art

A common data storage system is depicted in FIG. 1. The common data storage system may include a logical hierarchy of physical components. For example, a typical storage system may include one or more hard disks 106 for storing data. The hard disks 106 may be organized into one or more arrays 104. Often such arrays 104 are mirrored for data backup and redundancy on a second array 104. A typical array 104 includes one or more hard disks 106. Most common arrays 104 include several hard disks 106. The next logical level of the storage hierarchy is a rank 102. The rank 102 typically includes one or more arrays 104 of hard disks 106.

In a common storage system, the ranks 102, arrays 104 and hard disks 106 are arranged into a logical hierarchy using configuration information. The configuration information is typically stored across the hard disks 106. A storage manager may generate the configuration information and store it on the hard disks 106. The configuration information defines the logical relationship between the physical devices. The storage manager may, for example, create an array 104 of multiple hard disks 106. The configuration information defining the relationship is then stored on the hard disks 106.

However, configuration of complex logical structures in a large storage system may be difficult and time consuming. This is especially the case when a logical relationship already exists and must be modified. For example, if the storage manager needs to delete a rank 102 to define a new logical relationship between the hard disks 106 arranged within the rank 102, each of the disks will need to be reformatted to delete the current configuration information. In a typical system, which includes several hard disks 106, reformatting may take several hours. In common systems, the reformatting process must be completed before the rest of the configuration job can be completed.

One problem with the common storage system is that the system administrator typically needs to check back on the system repeatedly to see if the disks have finished reformatting before he can proceed with reconfiguration of the hard disks 106. Since a typical system administrator may be responsible for several storage systems, much of his time may be wasted on checking the systems to see if they are available for configuration. Since most system administrators are concerned about the availability of their storage systems to system users, many administrators will perform configuration jobs at night or on weekends. Thus, an entire night may be wasted on checking to see if hard disks 106 have been reformatted before continuing with the configuration job.

Once the disks have been formatted, the storage manager typically retrieves the physical parameters of each of the hard disks 106 before continuing with configuration. The physical parameters may include the storage capacity, the disk rotation speed, driver or firmware information, and the like. The storage manager typically requires the physical parameters of the hard disks 106 for optimization of the logical configuration, and to generate new configuration information based on these parameters. The newly generated configuration data is typically stored on the hard disks 106. However, the storing typically may not be performed until the hard disks 106 have been completely reformatted. Thus the storage manager is typically not able to continue with configuration of the logical hierarchy until the hard disks 106 have been reformatted. The storage manager may then generate and store the new configuration information on the hard disks 106.

SUMMARY OF THE INVENTION

From the foregoing discussion, it should be apparent that a need exists for an apparatus, system, and method that facilitate uninterrupted configuration of a storage system. Beneficially, such an apparatus, system, and method would streamline the configuration process, improving the efficiency of a typical storage manager, and allowing a storage system administrator to focus his attention on other tasks.

The present invention has been developed in response to the present state of the art, and in particular, in response to the problems and needs in the art that have not yet been fully solved by currently available storage systems. Accordingly, the present invention has been developed to provide an apparatus, system, and method for uninterrupted storage configuration that overcome many or all of the above-discussed shortcomings in the art.

The apparatus for uninterrupted storage configuration is provided with a plurality of modules configured to functionally execute the steps of generating a temporary location for storage configuration information, saving the storage configuration information to the temporary location, and copying the storage configuration information from the temporary location to a storage medium in response to a determination that the storage medium is physically configurable. In one embodiment, these modules include an initialization module, a storage manager interface, and a storage medium interface.

In a further embodiment, the initialization module may further comprise a memory manager in communication with a memory device and configured to create a first temporary storage location in the memory device to store the configuration information. The storage manager interface may comprise a status module configured to indicate to the storage manager that the storage medium is available for configuration regardless of whether the storage medium is physically available for configuration. The storage medium interface may further comprise a storage monitor configured to determine whether the storage medium is physically configurable.

The storage manager interface module may further comprise a parameter collection module configured to collect the physical parameters of the storage medium. In a further embodiment, the parameter collection module may further comprises a virtual image builder configured to generate a virtual image of the storage medium using the physical parameters collected by the parameter collection module. Additionally, the memory manager may be further configured to create a second temporary storage location in the memory device to store the virtual image of the storage medium.

A system of the present invention is also presented for uninterrupted storage configuration. In one embodiment, the system includes a storage medium, a storage manager, and a virtual configuration apparatus. In a certain embodiment, the storage medium is configurable as part of a logical data storage hierarchy. The storage manager may be in communication with the storage medium, and configured to perform configuration operations on the storage medium. In one embodiment, the virtual configuration apparatus is in communication with the storage manager and the storage medium.

The virtual configuration apparatus may be configured to generate a temporary location for storage configuration information. In a further embodiment, the virtual configuration apparatus may save the storage configuration information generated by the storage manager to the temporary location. Additionally, the virtual configuration apparatus may copy the storage configuration information from the temporary location to the storage medium in response to a determination that the storage medium is physically configurable.

In a further embodiment, the virtual configuration apparatus is in communication with a memory device. In such an embodiment, the virtual configuration apparatus may be configured to create a first temporary storage location in the memory device to store the configuration information, and create a second temporary storage location in the memory device to store the virtual image of the storage medium.

A method of the present invention is also presented for uninterrupted storage configuration. The method in the disclosed embodiments substantially includes the steps necessary to carry out the functions presented above with respect to the operation of the described apparatus and system. In one embodiment, the method includes generating a temporary location for storage configuration information. In a further embodiment, the method may include saving the storage configuration information generated by a storage manager to the temporary location. Additionally, the method may include copying the storage configuration information from the temporary location to a storage medium in response to a determination that the storage medium is physically configurable.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered as limiting of its scope, the invention will be described and explained with additional specificity and detail through the use of the accompanying drawings, in which.

DETAILED DESCRIPTION OF THE INVENTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
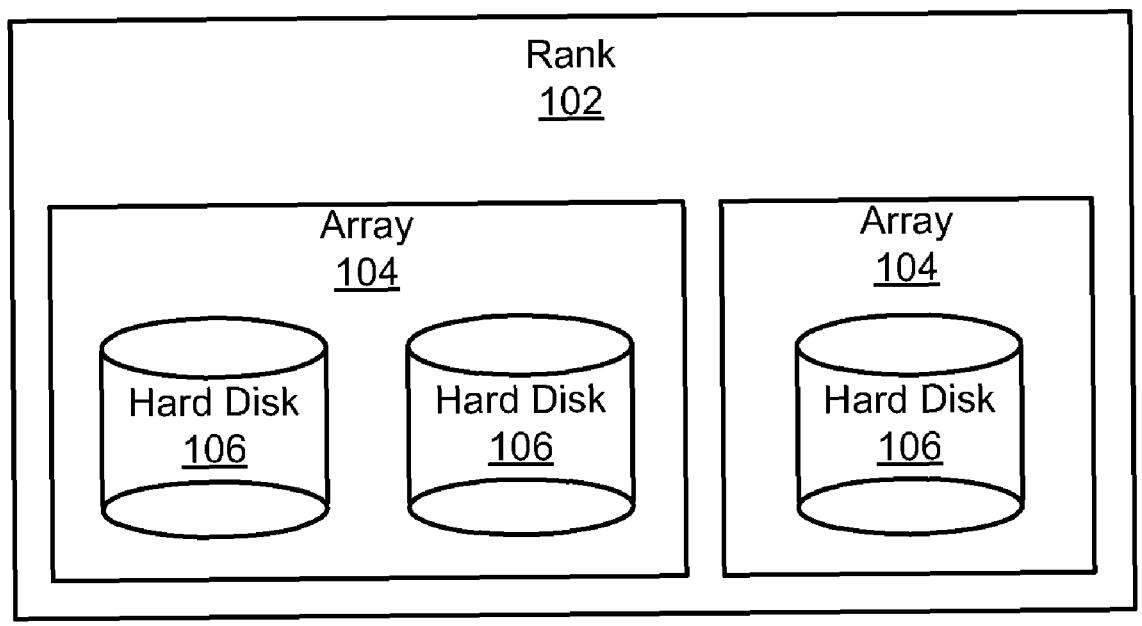
FIG. 1 is a schematic block diagram illustrating a typical storage system configuration of the prior art.
Figure 2:
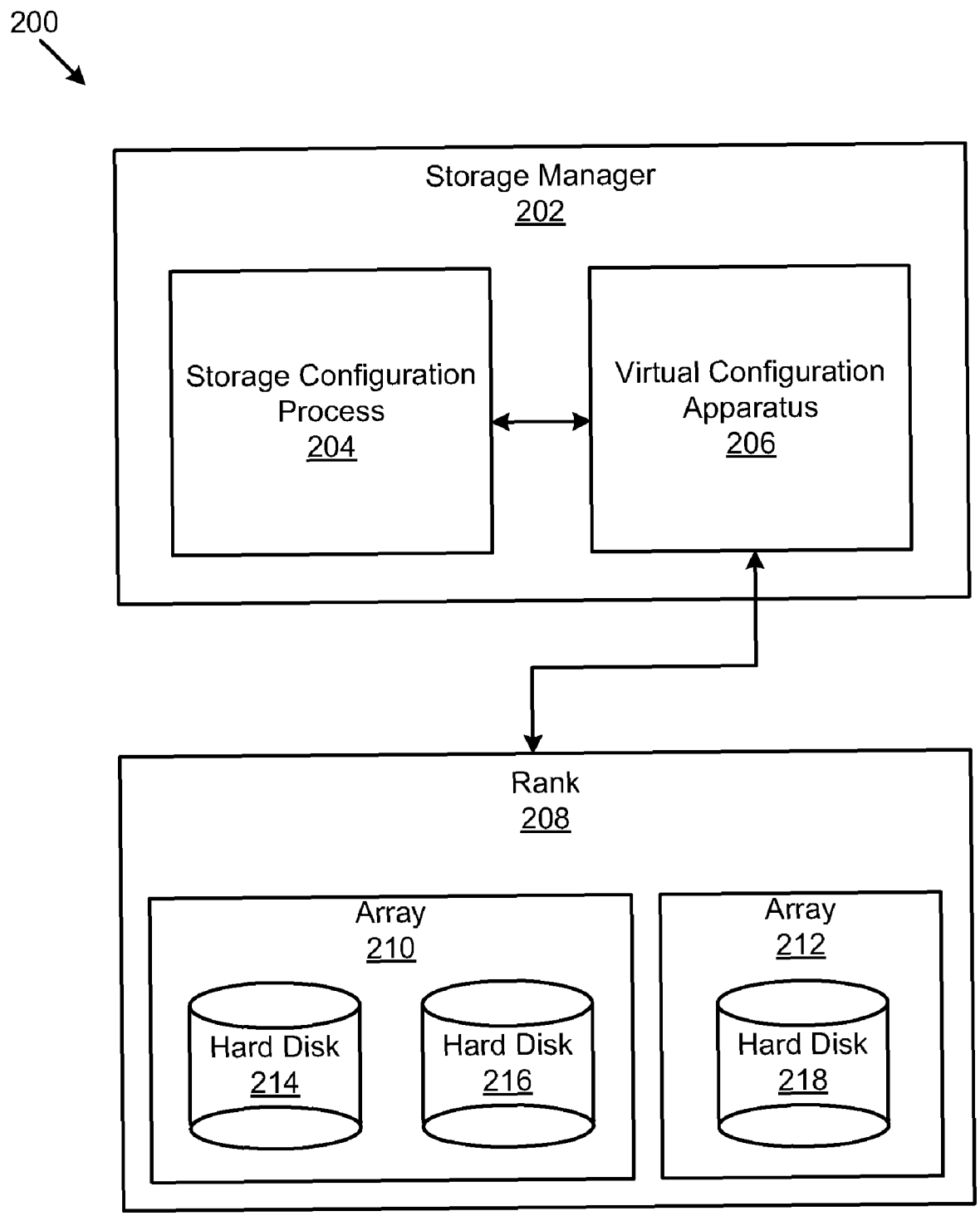
FIG. 2 is a schematic block diagram illustrating one embodiment of a system for uninterrupted storage configuration.

FIG. 2 is a schematic block diagram illustrating one embodiment of a system 200 for uninterrupted storage configuration. In the depicted embodiment, the system 200 includes a storage manager 202. The storage manager 202 may include a storage configuration process 204. Additionally, the system 200 may include a virtual configuration apparatus 206. In a further embodiment, the system 200 includes a logical hierarchy of storage media. The logical hierarchy may include a rank 208 divided into a plurality of arrays 210, 212. The arrays 210, 212 may include one or more hard disks 214-218.

As depicted in FIG. 2, the storage manager 202 also includes a virtual configuration apparatus 206. However, alternative embodiments of the system 200 may exist wherein the virtual configuration apparatus 206 is a separate device housed in an individual housing. Alternatively, the virtual configuration apparatus 206 may include an electronic circuit card housed within the housing of the storage manager 202. In yet another embodiment, the virtual configuration apparatus 206 may include a computer readable storage medium which holds machine-readable instructions. The instructions may be executable by a digital processor of the storage manager 202, and configured to perform an operation for uninterrupted storage configuration.

In one embodiment, the virtual configuration apparatus 206 is configured to generate a temporary location for storage configuration information, save the storage configuration information to the temporary location, and copy the storage configuration information from the temporary location to a storage medium in response to a determination that the storage medium is physically configurable.

Structurally, the virtual configuration apparatus 206 is in communication with the storage manager 202. In a particular embodiment, the virtual configuration apparatus 206 is in communication with a processor of the storage manager 202 configured to carry out a storage configuration process 204. Additionally, the virtual configuration apparatus 206 may be in communication with a storage medium. As illustrated in FIG. 2, the virtual configuration apparatus is in communication with a storage medium. In the depicted embodiment, the storage medium includes hard disks 214-218.

In one embodiment, the virtual configuration apparatus 206 may be in communication with the storage medium through a data bus. For example, the virtual configuration apparatus 206 may be in communication with hard disks 214-218 using Small Computer System Interface ("SCSI") cables, fiber optic data cables, Ethernet cables, or out of band RS-232 component interface cables. The virtual configuration apparatus 206 maybe in communication with the storage manager 202 in like manner.

The hard disks 214-218 may be incorporated into a logical storage hierarchy. For example, a first hard disk 214 and a second hard disk 216 may be organized into a first array 210. A third hard disk 218 may be included in a second array 212. The first array 210 and the second array 212 may be included in a storage rank 208. In certain embodiments, this logical hierarchy of storage media may be presented to a user of the storage system as a grouping of directories and subdirectories. Alternatively, the second array 212 may be mirrored to the first array 210 in order to generate a backup copy of the data stored on the first array 210. Various logical topologies may be established and configured by a system administrator using the storage configuration process 204 on the storage manager 202.

In one embodiment, the storage configuration process 204 may include an executable file of compiled instructions. The executable file may be coded in various computer coding languages including C, C++, Basic, Java, and the like. In one embodiment, the storage configuration process 204 is run on a processor of the storage manager 202. In certain further embodiments, the storage configuration process 204 may include operations for interacting with a storage system administrator.

For example, the storage system administrator may load configuration requirements into the storage configuration process 204. The storage configuration process 204 may then create configuration information, which is temporarily stored in a temporary location by the virtual configuration apparatus 206. In response to a determination that the hard disks 214-216 are configurable, the virtual configuration apparatus 206 may copy the configuration information from the temporary location to the hard disks 214-218. In such an example, the configuration process 204 may be uninterrupted in completing the configuration job when the virtual configuration apparatus 206 is employed.

Figure 3:
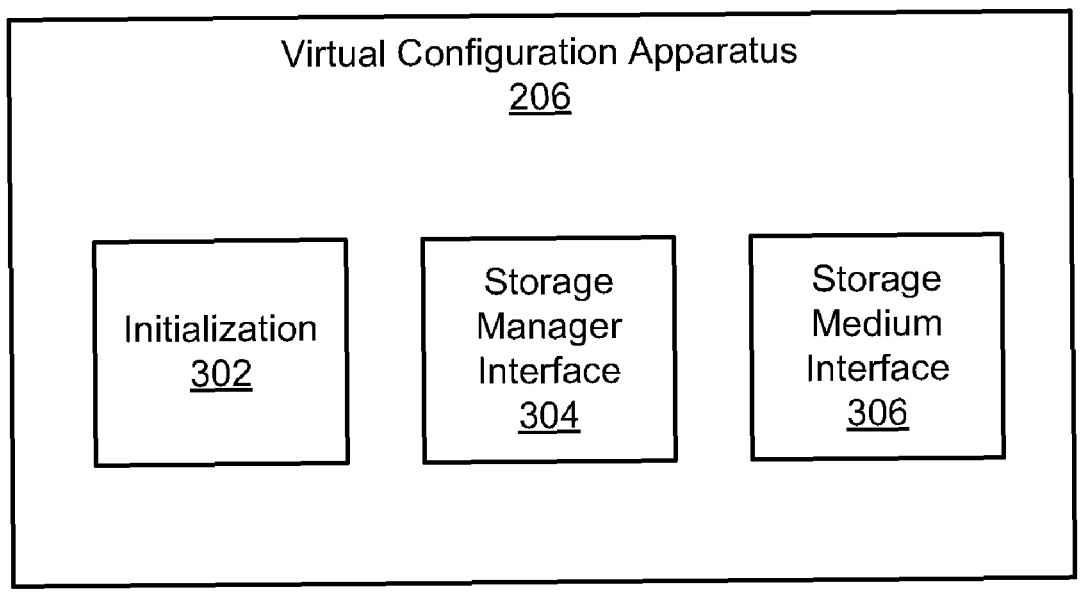
FIG. 3 is a schematic block diagram illustrating one embodiment of an apparatus for uninterrupted storage configuration.

FIG. 3 is a schematic block diagram illustrating one embodiment of an apparatus 300 for uninterrupted storage configuration. In the depicted embodiment, the apparatus 300 is a virtual configuration apparatus 206 described in relation to the system 200 of FIG. 2. In one embodiment, the virtual configuration apparatus 206 includes an initialization module 302, a storage manager interface 304, and a storage medium interface 306.

The initialization module 302 may be in communication with the storage manager 202. In such an embodiment, the initialization module may generate a temporary location for storage configuration information. The storage configuration process 204 on the storage manager 202 may generate the storage configuration information. In an alternative embodiment, the initialization module 302 may also be in communication with the storage manager interface 304 and the storage medium interface 306. In such an embodiment, the initialization module 302 may also initialize or trigger the storage manager interface 304 and the storage medium interface 306 to perform various operations.

In one embodiment, the storage manager interface 304 is in communication with the initialization module 302. Alternatively, the storage manager interface 304 may be in communication with the storage manager 202, and specifically to the storage configuration process 204 on the storage manager 202. The storage manager interface 304 may be configured to save storage configuration information generated by the storage manager 202 to the temporary storage location created by the initialization module 302. Specific embodiments of these modules and processes are discussed further with relation to FIG. 4 below.

Once the configuration information is stored in the temporary location, and in response to a determination that the storage medium is configurable, the storage medium interface 306 may copy the configuration information to the storage medium. For example, in response to a determination that the hard disks 214-218 have been successfully reformatted, the storage medium interface 306 may copy configuration information generated by the storage configuration process 204 on the storage manager from the temporary location to the hard disks 214-218.

Figure 4:
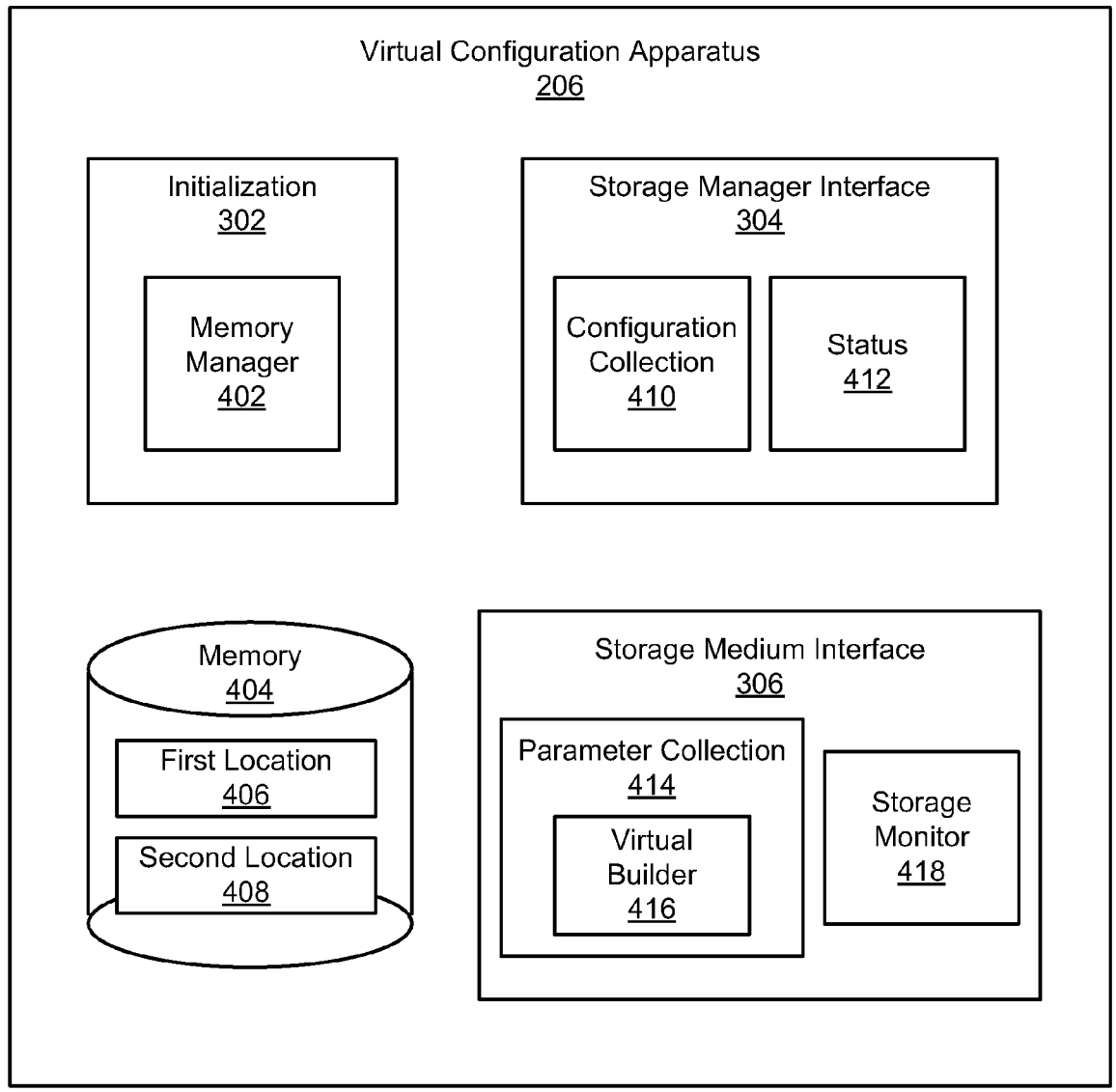
FIG. 4 is a detailed schematic block diagram illustrating a detailed embodiment of an apparatus for uninterrupted storage configuration.

FIG. 4 is a detailed schematic block diagram illustrating a detailed embodiment of a virtual configuration apparatus 206. In the depicted embodiment, the virtual configuration apparatus 206 includes the initialization module 302, the storage manager interface 304 and the storage medium interface 306 as described above with relation to FIG. 3. Additionally, the virtual configuration apparatus 206 may include a memory device 404.

In a further embodiment, the initialization module 302 may include a memory manager 402. The memory manager 402 may be in communication with the memory device 404. The memory manager 402 may be configured to create a first temporary storage location 406 in the memory device 404 to store the configuration information obtained by the storage manager interface 304 from the storage manager 202. In a further embodiment, the memory manager 402 may additionally create a second location 408 in the memory device 404 to store a virtual image of the storage medium. The virtual image of the storage medium is discussed in further detail with regard to detailed embodiments of the storage medium interface 306 below.

In one embodiment, the first location 406 and the second location 408 are list data structures created in the memory 404 of the virtual configuration apparatus 206. In an alternative embodiment, the first and second locations 406, 408 may be created in a memory device 404 located on the storage manager 202. In various embodiments, the first location 406 and the second location 408 may include a data array, a hash table, a table of pointers to strings or arrays of data, a portable data object, or other various forms of tables, arrays, and data structures.

For example, the first location 406 may include pre-allocated space in a memory device 404 located on the storage manager 202. The first location 406 may contain a list of data structures, wherein each member of the list represents a hard disk 214-218, and each data structure contains the configuration information for the given hard disk 214-218. In such an example, the first data structure in the list may contain configuration information for the first hard disk 214. The second data structure in the list may contain configuration information for the second hard disk 216, etc. In such an exemplary embodiment, the first location 406 temporarily holds the configuration information in the list of data structures until it is determined that the hard disks 214-218 are configurable. When it is determined that the hard disks 214-218 are configurable, the configuration information is copied to the hard disks 214-218 respectively.

Additionally, the memory manager 402 may create a second temporary location 408 in the memory device 404 to store a virtual image of the storage medium. For example, the storage medium interface module 306 may include a parameter collection module 414. In this exemplary embodiment, the parameter collection module 414 may collect physical parameters from the hard disks 214-218. The physical parameters may include the disk's rotation speed, the classification or model of the disk, the disk capacity, and the disk interface type (e.g., Fibre Channel Arbitrated Loop ("FC-AL"), Serial Attached SCSI ("SAS"), Advanced Technology Attachment ("ATA"), Serial ATA ("SATA"), etc.) These physical parameters may be required by the storage configuration process 204 in order to carry out the configuration process. The typically, the storage configuration process 204 would be unable to obtain the parameters when the hard disks 214-218 are unavailable for configuration changes.

However, the parameter collection module 414 may either collect the physical parameters prior to the hard disks 214-218 becoming unavailable to optimize performance, or the parameter collection module 414 may start collecting the physical parameters after the hard disks 214-218 are already unavailable. A virtual builder 416 may create a virtual image of the hard disks 214-218 using the physical parameters collected by the parameter collection module 414. In one embodiment, the virtual builder 416 may organize the physical parameters collected by the parameter collection module 414 into lists and data structures. The order of the list corresponds to the individual hard disks 214-218, and the data structures contain the physical parameters. This virtual image may be stored in the second temporary location 408 on the memory device 404. In a particular embodiment, the lists and data structures of the first temporary location 406 are tied to the lists and data structures of the second temporary location 408 so that the configuration information accurately corresponds to the physical parameters. The temporary locations 406, 408 may be tied using registry pointers or the like.

Once the virtual image of the storage medium and the first temporary location 406 for storing configuration information have been generated, the configuration process can continue regardless of whether the storage medium is physically configurable. In one embodiment, the storage manager interface 304 may include a status module 412. The status module 412 may indicate to the storage manager 202 that the storage medium is available for configuration, even though the storage medium is not physically available for configuration. For example, the status module 412 may return a value indicating that the hard disks 214-218 are available for configuration to the storage configuration process 204. The value may include a Boolean value, or some other flag, indicator, or like signal for indicating the availability of the hard disks 214-218. In such an example, the storage configuration process 204 is tricked into continuing with the configuration procedure, even though it would not ordinarily do so.

The storage manager interface 304 may additionally include a configuration collection module 410. The configuration collection module 410 may be in communication with the configuration manager 202, and receive configuration information form the storage configuration process 204. In a typical system, the storage information would be written directly to the storage medium. However, in the depicted embodiment, the configuration collection module 410 collects the configuration information and stores it in the first temporary location 406.

Meanwhile, the storage monitor 418 may concurrently check the storage medium to determine whether the storage medium is physically configurable. In an alternative embodiment, the two operations may not be concurrent, but queued for execution in series. In one exemplary embodiment, the storage monitor 418 may include a daemon process, or some other background process, or processing thread. In a further embodiment, the storage monitor 418 may be triggered by the initialization module 302 upon initialization of the virtual configuration apparatus 206. When the storage monitor 418 determines that the storage medium is configurable, the storage medium interface 306 may copy the configuration information from the first temporary location 406 to the storage medium. In a further embodiment, the first temporary location 406 and the second temporary location 408 may be deleted. A detailed example of one embodiment of a method for operating the modules of FIG. 4 is described below with relation to the method of FIG. 6.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
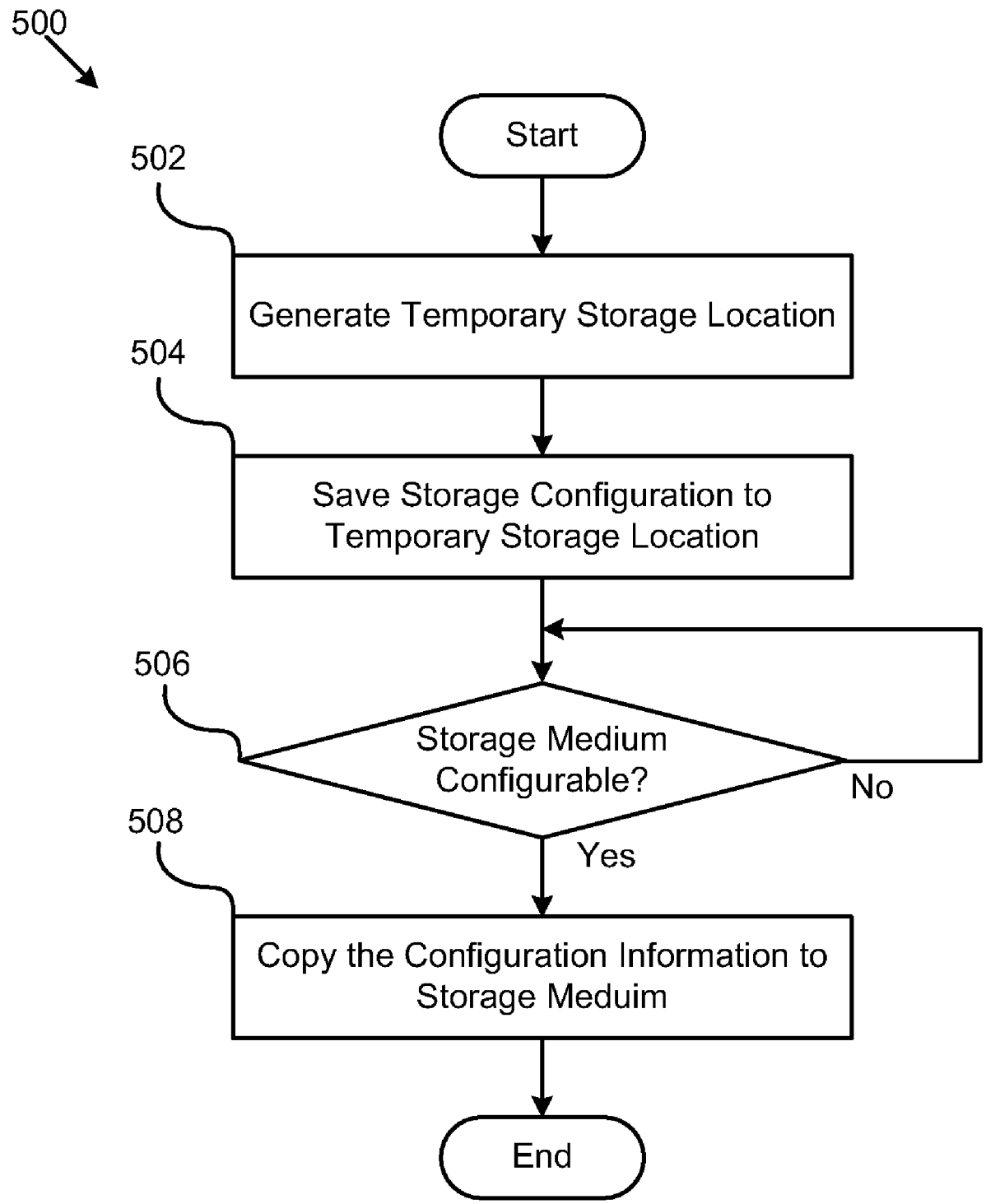
FIG. 5 is a schematic flow chart diagram illustrating one embodiment of a method for uninterrupted storage configuration.

FIG. 5 is a schematic flow chart diagram illustrating one embodiment of a method 500 for uninterrupted storage configuration. In one embodiment, the method starts when the initialization module 302 generates 502 a temporary location 406 for storage configuration information. The storage manager interface 304 may then save 504 the storage configuration information generated by the storage manager 202 to the temporary location 406. The apparatus 300 may continue to monitor the storage medium until it is determined 506 that the storage medium is configurable. If it is determined 506 that the storage medium is configurable, then the storage medium interface 306 copies 508 the configuration information from the temporary location 408 to the storage medium and the method 500 ends.

For example, the configuration process 204 on the storage manager 202 may delete a rank 208. Each of the hard disks 214-218 within the rank 208 will be unavailable for configuration while they are being reformatted. However, the initialization module 302 may generate 502 a temporary location 408 for configuration information. The configuration manager interface 304 may then save 504 the configuration information to the temporary location 408 while the hard disks 214-218 are being reformatted. In response to a determination 506 that the hard disks 214-216 are configurable, the storage medium interface 306 may then copy 508 the configuration information from the temporary location 408 to the hard disks 214-218.

Figure 6:
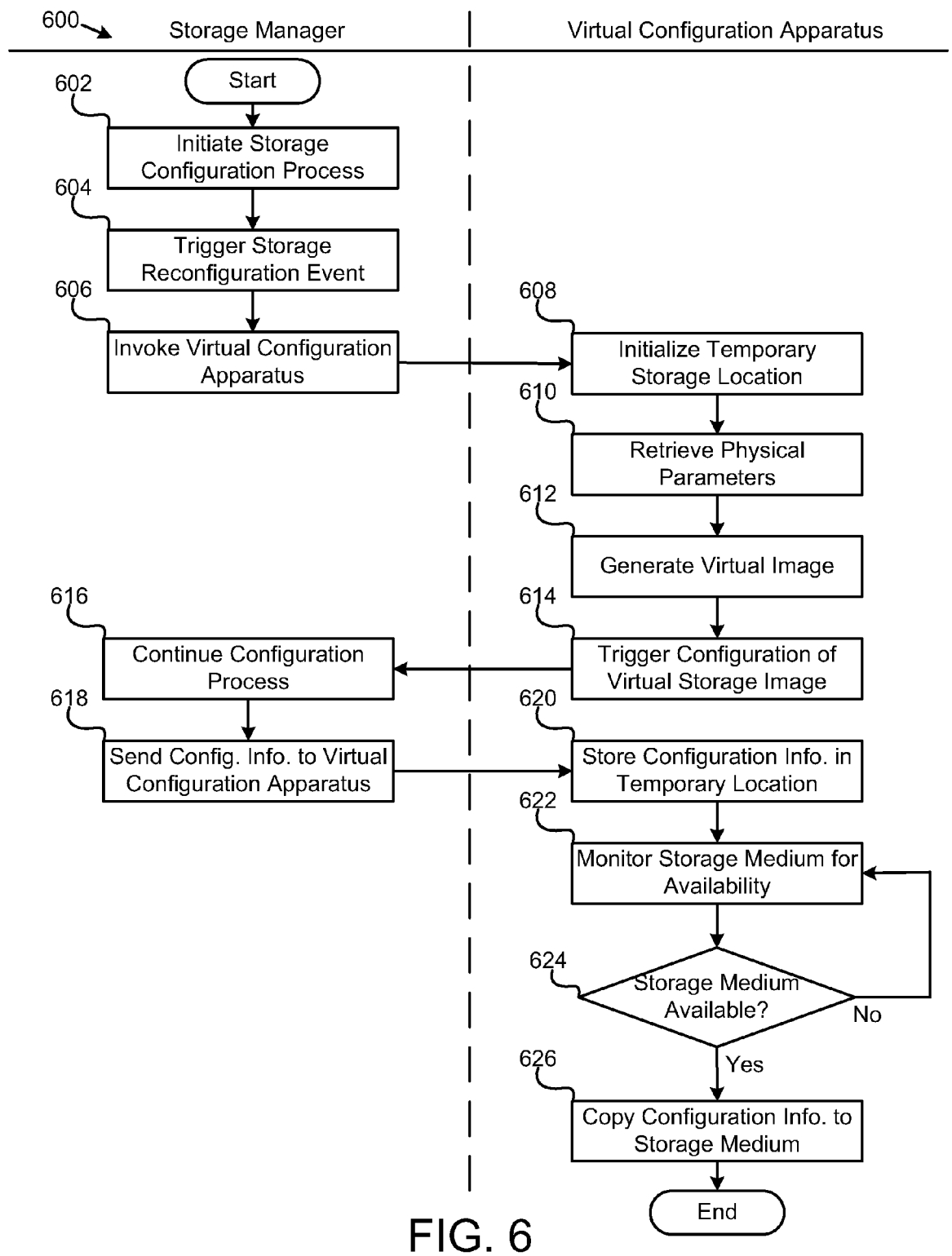
FIG. 6 is a detailed schematic flow chart diagram illustrating a detailed embodiment of a method for uninterrupted storage configuration.

FIG. 6 is a detailed schematic flow chart diagram illustrating a detailed embodiment of a method 600 for uninterrupted storage configuration. In one embodiment, the method 600 includes operations of the virtual configuration apparatus 206. The method 600 may also include receiving data or information generated by certain responses from other components of the system 200, such as the storage manager 202.

In one embodiment, the method 600 starts when the storage manager initiates 602 a storage configuration process 204. The storage configuration process 204 may trigger 604 a storage reconfiguration event. For example, the storage configuration process 204 may delete a rank 208. In response to the delete operation, the hard disks 214-218 may become unavailable while being reformatted. The storage configuration process 204 may then invoke 606 the virtual configuration apparatus 206. Alternatively, the virtual configuration apparatus 206 may be invoked 606 by the storage manager 202 at the same time as initiating 602 the storage configuration process. In another alternative embodiment, the virtual configuration apparatus 206 is invoked 606 by a user or another process within the storage manager 202.

The initialization module 302 may initialize 608 a temporary storage location for the configuration information. In a further embodiment, the initialization module 302 may also initialize 608 a temporary storage location for a virtual image of the storage medium. The parameter collection module 414 may then retrieve 610 the physical parameters of the storage medium. The virtual builder 416 may then generate 612 a virtual image of the storage medium using the physical parameters retrieved 610 by the parameter collection module 414.

The status module 412 may then trigger 614 the storage configuration process 204 to continue 616 with configuration tasks. In one embodiment, the configuration process 204 may then continue 616 configuring the storage medium based on the virtual image of the storage medium stored in the second temporary location 408. The storage configuration process 204 may send 618 the configuration information to the configuration collection module 410 of the virtual configuration apparatus 206.

The configuration collection module 410 may store 620 the configuration information in the first temporary location 406. The storage monitor 418 may continuously monitor 622 the storage medium to determine 624 whether the storage medium is available. If the storage monitor determines 624 that the storage medium is available for configuration, the storage medium interface 306 may copy 626 the configuration information stored in the first temporary location 406 to the storage medium, and the method 600 ends.

In another exemplary embodiment, the storage manager 202 may initiate 602 the configuration process 204. The configuration process 204 may trigger 604 a reconfiguration event on the hard disks 214-218 by deleting the rank 208. In response to deleting the rank 208 the hard disks 214-218 are reformatted and unavailable for further configuration until the reformatting process is complete. However, the storage manager 202 may invoke 606 the virtual configuration apparatus 206, so that the configuration process 204 may continue uninterrupted.

The initialization module 302 of the virtual configuration apparatus 206 may then initialize 608 a temporary location for configuration information. In such an example, the memory manager 402 may generate a first temporary location 406 and a second temporary location 408 on the memory device 404 locate in the virtual configuration apparatus 206. The initialization module 302 may additionally trigger the storage monitor 418 to monitor 622 the hard disks 214-218 to determine 624 whether the reformatting process is complete.

The parameter collection module 414 of the storage medium interface 306 may then retrieve 610 the physical parameters from the hard disks 214-218. In an alternative example, the parameter collection module 414 may have retrieved 610 the physical parameters prior to triggering 604 the storage reconfiguration event. The virtual builder 416 may then generate 612 a virtual image of the hard disks 214, which includes physical parameters such as the rotation speed, and capacity of the hard disks 214-218. The virtual builder may store the virtual image in the second temporary location 408 in the memory device 404.

The configuration manager interface 304 may then trigger 614 continuation 616 of the configuration process 204. In an alternative embodiment, the trigger 614 may include a signal from the status module 412 indicating that the hard disks 214-218 are available for further configuration. The storage configuration process 204 may then continue the configuration process 616 uninterrupted by the reformatting event. The storage manager may then send 618 configuration information 618 generated by the storage configuration process 204 to the virtual configuration apparatus 206.

The configuration collection module 410 may store the configuration information in the first temporary location 406. For example, the configuration collection module 410 may store an identifier indicating which rank 208 and array 210 the first hard disk 214 is assigned to operate within. When the storage monitor 418 determines 624 that the first hard disk 214 is available for configuration, the storage medium interface 306 may copy the configuration information from the first temporary location 406 to the first hard disk 214. In a further embodiment, the virtual configuration apparatus 206 may delete the configuration information and virtual image corresponding to the first hard disk 214 when the configuration information has been successfully copied to the first hard disk 214.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for uninterrupted storage configuration, the apparatus comprising:

an initialization module coupled to a storage manager, wherein the initialization module is configured to generate a temporary location for new storage configuration information generated by the storage manager, the new storage configuration information comprising at least one new logical relationship between the at least two storage devices, the at least one new logical relationship being different than at least one existing logical relationship between the at least two storage devices;

a storage manager interface coupled to the initialization module, wherein the storage manager interface is configured to save the new storage configuration information generated by the storage manager to the temporary location instead of the at least two storage devices in response to a determination that the at least two storage devices are not physically configurable; and a storage medium interface coupled to the at least two storage devices, wherein the storage medium interface is configured to copy the new storage configuration information from the temporary location to the at least two storage devices in response to a determination that a status of the at least two storage devices has changed from not being physically configurable to being physically configurable.

2. The apparatus of claim 1, wherein the initialization module further comprises a memory manager coupled to a memory device and configured to create a first temporary storage location in the memory device to store the new storage configuration information.

3. The apparatus of claim 1, wherein the storage medium interface further comprises a parameter collection module configured to collect the physical parameters of the at least two storage devices.

4. The apparatus of claim 3, wherein the parameter collection module further comprises a virtual image builder configured to generate a virtual image of the at least two storage devices using the physical parameters collected by the parameter collection module.

5. The apparatus of claim 4, wherein the memory manager is further configured to create a second temporary storage location in the memory device to store the virtual image of the at least two storage devices.

6. The apparatus of claim 1, wherein the storage manager interface further comprises a status module configured to indicate to the storage manager that the at least two storage devices are available for configuration regardless of whether the at least two storage devices are physically available for configuration.

7. The apparatus of claim 1, wherein the storage medium interface further comprises a storage monitor module configured to determine whether the at least two storage devices are physically configurable.

8. A system for uninterrupted storage configuration, the system comprising:
   at least two storage mediums configurable as part of a logical data storage hierarchy;
   a storage manager coupled to the storage medium, and configured to perform configuration operations on the at least two storage mediums; and
   a virtual configuration apparatus coupled to the storage manager and the at least two storage mediums, the virtual configuration apparatus configured to:
      generate a temporary location for new storage configuration information generated by the storage manager, the new storage configuration information comprising at least one new logical relationship between the at least two storage mediums, the at least one new logical relationship being different than at least one existing logical relationship between the at least two storage mediums;
      save the new storage configuration information generated by the storage manager to the temporary location instead of the at least two storage mediums in response to a determination that the at least two storage mediums are not physically configurable; and
      copy the new storage configuration information from the temporary location to the at least two storage mediums in response to a determination that a status of the at least two storage mediums has changed from not being physically configurable to being physically configurable.

9. The system of claim 8, wherein the virtual configuration apparatus is further configured to collect a physical parameter of the at least two storage mediums.

10. The system of claim 9, wherein the virtual configuration apparatus is further configured to generate a virtual image of the at least two storage mediums using the physical parameters collected by the parameter collection module.

11. The system of claim 10, wherein the virtual configuration apparatus is coupled to a memory device and configured to:
   create a first temporary storage location in the memory device to store the new storage configuration information; and
   create a second temporary storage location in the memory device to store the virtual image of the at least two storage mediums.

12. The system of claim 8, wherein the virtual configuration apparatus is further configured to indicate to the storage manager that the at least two storage mediums are available for configuration regardless of whether the at least two storage mediums are physically available for configuration.

13. The system of claim 8, wherein virtual configuration apparatus is further configured to determine whether the at least two storage mediums are physically configurable.

14. A computer readable storage medium tangibly embodying a program of machine-readable instructions executable by a digital processing apparatus to perform an operation for uninterrupted storage configuration, the operation comprising:
   generating a temporary location for new storage configuration information comprising at least one new logical relationship between at least two storage devices, the at least one new logical relationship being different than at least one existing logical relationship between the at least two storage devices;
   saving the new storage configuration information to the temporary location instead of the at least two storage devices in response to a determination that the at least two storage devices are not physically configurable; and
   copying the storage configuration information from the temporary location to the at least two storage devices in response to a determination that the at least two storage devices are physically configurable.

15. The computer readable storage medium of claim 14, wherein the operation further comprises collecting a physical parameter of the at least two storage devices.

16. The computer readable storage medium of claim 15, wherein the operation further comprises generating a virtual image of the at least two storage devices using the physical parameters collected by the parameter collection module.

17. The computer readable storage medium of claim 16, wherein generating further comprises:
   create a first temporary storage location in the memory device to store the new storage configuration information; and
   create a second temporary storage location in the memory device to store the virtual image of the at least two storage devices.

18. The computer readable storage medium of claim 14, wherein the operation further comprises indicating to the storage manager that the at least two storage devices are available for configuration regardless of whether the at least two storage devices are physically available for configuration.

19. The computer readable storage medium of claim 14, wherein copying further comprises determining whether the at least two storage devices are physically configurable.

20. A method for uninterrupted storage configuration, the method comprising:

generating a temporary location for new storage configuration information comprising at least one new logical relationship between at least two storage devices, the at least one new logical relationship being different than at least one existing logical relationship between the at least two storage devices, the new storage configuration information being generated by a storage manager;

saving the new storage configuration information to the temporary location instead of the at least two storage devices in response to a determination that the at least two storage devices are not physically configurable; and copying the new storage configuration information from the temporary location to the at least two storage devices in response to a determination that the at least two storage devices are physically configurable.

* * * * *